United States Patent [19]

Vassiliades et al.

[11] 3,844,816

[45] Oct. 29, 1974

[54] GRAFTED, POLYMERIC MICROCAPSULAR SYSTEM

[75] Inventors: Anthony E. Vassiliades, Deerfield; David N. Vincent, Glenview, both of Ill.; Shrenik Shroff, Bombay, India

[73] Assignee: U.S. Plywood-Champion Papers Inc., New York, N.Y.

[22] Filed: Mar. 15, 1972

[21] Appl. No.: 235,008

Related U.S. Application Data

[63] Continuation-in-part of Ser. No. 142,772, May 12, 1971.

[52] U.S. Cl............ 117/36.2, 117/21, 117/36.1, 117/36.8, 117/93.31, 117/100 C, 117/118, 252/316
[51] Int. Cl............................................ B41m 5/12
[58] Field of Search ..... 117/36.1, 36.2, 36.8, 93.31, 117/142, 772, 21, 100 C, 118; 252/316

[56] References Cited
UNITED STATES PATENTS

| | | | |
|---|---|---|---|
| 2,655,453 | 10/1953 | Sandberg | 117/36.1 |
| 3,281,263 | 10/1966 | Priesing | 117/93.31 |
| 3,386,851 | 6/1968 | Harlan | 117/93.31 |
| 3,405,071 | 10/1968 | Reyes | 117/100 C |
| 3,429,827 | 2/1969 | Ruus | 252/316 |
| 3,481,759 | 12/1969 | Ostlie | 117/36.2 |
| 3,516,941 | 6/1970 | Matson | 117/100 C |
| 3,577,515 | 5/1971 | Vandegaer | 117/100 B |
| 3,617,334 | 11/1971 | Brockett et al. | 117/36.2 |
| 3,625,736 | 12/1971 | Matsukawa et al. | 117/36.2 |

*Primary Examiner*—William D. Martin
*Assistant Examiner*—Bernard D. Pianalto
*Attorney, Agent, or Firm*—Roylance, Abrams, Berdo & Kaul

[57] ABSTRACT

Discrete, substantially spherical microcapsules having a solid polymeric shell and a solid, non-tacky polymeric core, which is grafted to the polymeric shell, are provided. Such microcapsules may be coated onto cellulosic substrates or incorporated into such substrates and subsequently fused to provide cellulosic substrates having a polymeric film bonded thereto and increased strength, respectively. The grafting of the normally nonadherent core material to the shell of the microcapsules provides a means of forming a bond between a normally nonadherent polymer and a cellulosic material. The microcapsules may be effectively employed as load-bearing agents and opacifying agents.

10 Claims, No Drawings

GRAFTED, POLYMERIC MICROCAPSULAR SYSTEM

This application is a continuation-in-part of U.S. Pat. application Ser. No. 142,772 filed on May 12, 1971 in the name of A.E. Vassiliades, S. Shroff and D.N. Vincent entitled "Grafted, Polymeric Microcapsular System."

This invention relates to grafted, polymerized, microcapsular products and the use of such products in the production of plastic coatings, opacifying agents, in record systems and spot welds for cellulosic fibers. More particularly, this invention relates to microcapsular products having a non-tacky, polymeric core.

Certain polymeric products including thermoplastics such as polystyrene, are normally nonadherent with respect to cellulosic materials such as paper substrates. However, for many applications it would be highly desirable to provide a cellulosic substrate with such a plastic coating. Such coatings possess certain desirable physical and chemical properties not possessed by cellulosic substrates, such as paper. Various proposals have been made for coating polymeric materials, such as polystyrene, onto or incorporating such polymers into cellulosic substrates. However, attempts to do so have proved unsuccessful due to the poor adhesion of the polymeric material to the cellulosic fibers. Although it would be advantageous to be able to produce films of thermoplastic materials on a paper substrate, for example, such films are normally incompatible and difficult to bond to paper. In addition, in many instances the resulting substrate has lost the desirable "paper qualities" in those instances where it is not desired to lose such qualities. For example, if you saturate a paper substrate with a polymeric suspension, you may end up with a substrate that does not have the desirable folding and/or flexibility properties of paper. Likewise, if the polymer particles are admixed with the cellulosic fibers to be formed into a paper sheet, there is the handling problem of retaining the polymeric particles with the fibers and preventing their passage into the effluent stream.

It has now been found that cellulosic substrates may be successfully coated and/or permeated with polymeric materials that are normally nonadherent to cellulosic substrates in their particulate form by treating such substrates with discrete, substantially spherical microcapsules, which have a solid, polymeric shell and a solid, non-tacky, polymeric core that is at least partially grafted to the shell. The polymeric shell of the microcapsules is composed of material or materials that are compatible with cellulosic materials, while the core is a non-tacky polymer and is at least partially grafted thereto. These microcapsules may be fused, if desired, and thus form a polymeric film that is compatible with a cellulosic substrate.

Thus, such microcapsules may be coated onto a cellulosic substrate or premeated into the cellulosic substrate, and the substrate may be heated to bond the capsules to the cellulosic fibers.

The microcapsules of the present invention are provided by forming precursor microcapsules having a monomeric core that is capable of being polymerized in situ to form a solid, non-tacky polymer. During polymerization, the polymeric core becomes at least partially grafted to the solid, polymeric shell which surrounds the core. Any monomeric material which is capable of being encapsulated in a microcapsule and polymerized therein to form a solid, non-tacky polymer may be employed in the present invention. Suitable monomeric materials include ethylenically unsaturated monomers, for example, acrylic esters, such as methyl acrylate, methyl methacrylate, methyl alpha-chloroacrylate; vinyl esters, such as vinylacetate; vinyl ketones, such as methyl vinyl ketone; as well as other miscellaneous vinyl monomers, such as vinylidene chloride, styrene, divinyl benzene, acrylonitrile and the like; olefins such as cyclopentadiene, alone or mixtures thereof to provide the desired properties.

The microcapsules of the present invention may be suitably utilized in any application wherein it is desired to bond a normally nonadherent polymer to a cellulosic material. Thus, for example, the present polymeric core-containing microcapsules may be coated onto a cellulosic substrate and thereafter subjected to appropriate heat and pressure conditions to provide an adherent polymeric coating that is bonded to the cellulosic substrate. For example, normally nonadherent polystyrene may be coated onto a paper substrate by providing styrene monomer in microcapsules and subjecting the capsules to polymerization conditions so as to form polystyrene, which is at least partially grafted to the capsule walls. Next, the microcapsules are coated onto paper. If it is desired, they may then be subjected to heat and pressure sufficient to fuse the capsules and form a polystyrene coating which is bonded to the paper to impart a plastic finish to the surface of the substrate. On the other hand, as will be hereinafter shown, if a polystyrene latex is coated onto a cellulosic substrate, the resultant coating is essentially nonadherent. On subjecting this sheet to temperature and pressure conditions suitable to provide the fusion of the polymer thereon, the resultant coating is highly unsatisfactory and has poor adhesion to the cellulosic substrate.

Additionally, small diameter, polymer-containing microcapsules of the present invention may be permeated into a performed paper web, or admixed with fibers to form a web containing interspersed capsules, for example, then heated to fusion in a press or calender thereby providing a "spot-welding" of the fibers at points of fiber intersection therewith by means of the fused polymer particles. Employing this technique, the paper can retain its "paper properties."

The quantity of polymer-containing microcapsules to be employed will depend upon the qualities desired in the ultimate product. Thus, for example, between about 1 and about 15 or 20 percent by weight of the resulting substrate may be comprised of the present polymer-containing microcapsules and the product will still retain its paperlike qualities. On the other hand, if a more rigid, plasticlike product is desired, the percentage of microcapsules may be increased.

A main aspect of the present invention relates to the employment of the grafted, polymeric microcapsules as load-bearing agents in record systems wherein image-forming microcapsules, e.d., microcapsules containing colorless dye precursors, are employed.

Thus, according to this aspect of the present invention, a record sheet is provided which comprises a substrate, such as paper, having a coating on a surface thereof comprising pressure-rupturable, image-forming, microcapsules and microcapsular load-bearing agents, said load-bearing agents consisting essentially of discrete, substantially spherical, non-pressure-rupturable, microcapsules having a solid, polymeric shell and a solid, preferably non-tacky, polymeric core, said core being at least partially grafted to said shell, said core and said shell being different polymeric materials.

Preferably, the polymeric shell of the microcapsular load-bearing agents of the present invention is formed of the same polymer as is the shell of the pressure-rupturable, image-forming microcapsules. In this manner, the microcapsular load-bearing agents are made compatible with the same binder materials, such as methyl cellulose, starch, etc., that are selected for the image-forming microcapsules. Thus, a separate binder material is not required for the image-forming microcapsules on the one hand, and the load-bearing microcapsules on the other.

The present microcapsular load-bearing agents may be formed of any of the various polymeric core materials and polymeric wall materials described herein, so long as the core is at least partially grafted to the wall of the microcapsule. Grafting is desirable to inhibit possible chipping or flaking of the capsule wall of the load-bearing agents during coating of the paper substrate or other handling of the microcapsular load-bearing agents. Preferably, the polymeric wall is formed of an hydroxylated polymer, such as methyl cellulose, a substituted starch, polyvinyl alcohol, or the like, or cross-linked by a formaldehyde condensation product, such as melamine or urea-formaldehyde. Preferred polymeric core materials are the thermoplastic and cross-linked thermoplastic polymers, such as polystyrene, polyvinyl chloride, polyvinyl acetate, or the like.

Accordingly, the microcapsular load-bearing agents of the present invention may be tailored to a particular record system by merely selecting the proper polymer for the capsule wall. The core of the load-bearing capsule may be an entirely different polymer from the shell, and need only be grafted to the capsule wall in order to form a compatibilized system.

The microcapsular load-bearing agents of the present invention act to prevent smudging and the like, caused by premature rupture of the image-forming microcapsules, for example, upon stacking of paper carrying the image-forming capsules. For this purpose, the present load-bearing agents are provided with an average diameter which is greater than that of the image-forming microcapsules and is as least as great as the thickness of the coating that contains the image-forming capsules, so that the load-bearing capsules will protrude through the surface of the image capsule-containing coating. The image-forming capsules normally have an average diameter in the range of between about 4 and about 25 microns, while the coating thickness is generally in the range of 10 or 15 to 30 microns.

For example, the load-bearing microcapsules may have an average diameter which is between about 5 and about 50 microns, preferably between about 15 and about 30 microns. Another advantage of the present invention resides in the relative ease of producing the discrete, substantially spherical load-bearing agents of the present invention within the 5 to 50 micron average diameter range necessary for microcapsular record systems.

Thus, according to the present invention, substantially spherical load-bearing agents having an average diameter between about 5 and about 50 microns are produced by providing discrete, substantially spherical microcapsules having a solid, polymeric and a liquid, polymerizable core which consists of a monomeric material capable of being polymerized to form a solid, non-tacky polymer. Next, the microcapsules are subjected to polymerization conditions to polymerize the core and at least partially graft the core to the shell.

Conventional emulsion polymerization techniques have been generally employed to provide polymer particles in the range of 0.2 micron or less, while suspension polymerization processes have been generally utilized to produce polymer particles in the 100 to 10,000 microns range. Thus, while the process of the present invention provides a relatively simple means of providing substantially spherical particles, it would be extremely difficult to provide substantially spherical polymer particles in the 5 to 50 micron average diameter range by the conventional emulsion or suspension polymerization techniques.

The load-bearing capsules of the present invention may be utilized in combination with any of the conventional image-forming microcapsules in a coating on a record sheet. For example, the present microcapsular load-bearing agents may be employed in a transfer sheet coating in combination with pressure-rupturable microcapsules, which have an oily core containing a colorless dye precursor of the type described in U.S. Pat. No. 3,418,656 to Vassiliades. The present microcapsular load-bearing agents may be merely admixed with the coating suspension containing the image-forming microcapsules containing a suitable binder, e.g., methyl cellulose, hydroxyethyl cellulose, polyvinyl alcohol, starch, soy protein, casein, etc., and coated on the web material and dried. The production of image-forming microcapsules, dyes employed, the coating of such capsules, etc. is well-known in the art as shown in the Vassiliades patent.

Any suitable concentration of microcapsular load-bearing agents per unit area of image-capsule-coated copy paper may be employed. For example, if the present load-bearing agents are utilized in combination with dye-precursor-containing capsules, a suitable range includes between about 2 and about 20 parts by weight of the dye-precursor capsules per part by weight of the microcapsular load-bearing agents, and preferably between about 2 and about 12 parts by weight dye precursor capsules per part of load-bearing capsules. On a core-to-core basis, suitable concentrations of load bearing capsules based upon the image-forming capsules, which have an oily core containing the dye precursor, include between about 5 and about 35, preferably between about 15 and about 25 parts by weight of non-tacky polymeric core material per 100 parts of dye-containing oily core material.

Load-bearing agents in the form of cellulosic fibers, oil-containing microcapsules and the like have been proposed. However, the load-bearing microcapsules of the present invention possess many advantages over the previously proposed load-bearing agents. For example, the present capsules are less fragile than are liquid-containing microcapsules. Likewise, the present load-bearing agents have a more desirable shape, and a size which is more easily controlled than is the case with cellulosic fiber-type load-bearing agents.

The present encapsulated polymeric material may be employed in various applications which demand strict control of polymer particle size. Thus, polymercontaining microcapsules may be formed, for example, having an average particle diameter or between about 0.2 and about 2.0 microns and preferably abetwen about 0.5 and about 1.0 micron may be used as opacifying agents. Surprisingly, it has been found that such particles are capable of imparting a high opacity to surface coatings of various substrates. Likewise, the present polymercontaining microcapsules may be interspersed with cellulosic fibers and formed into a web of such fibers. The polymercontaining microcapsules act as nonabrasive, opacifying agents and impart a high opacity to the cellulosic substrate ultimately formed.

Polymeric materials, which may be employed in the present system may possess a relatively low density, e.g., about one gram/cc. Thus, the present polymer-containing microcapsules do not greatly increase the weight of the substrate, such as the case with high density, inorganic pigments, e.g., $TiO_2$, which are conventionally employed to increase substrate opacity.

A multitude of applications have been proposed for microcapsular products. Whereas the most widely known and commercially accepted usage of such products has been in the field of record sheet materials, it has been proposed to provide microcapsules with a tacky, adhesive-containing core material which will provide an adhesive material upon rupture of the capsular wall. Thus, for example, U.S. Pat. No. 2,986,477 to Eichel discloses the production of an adhesive tape by providing a profusion of microcapsules containing a nucleus of a tacky adhesive on a base web, which adhesive is exposed upon rupture of the capsular wall. A similar disclosure is found in U.S. Pat. No. 2,907,682 wherein a substrate is coated with capsules containing a solid soluble adhesive and capsules containing a liquid solvent for the adhesive. More recently, U.S. Pat. No. 3,516,941 to Matson discloses an Example 15 wherein microcapsules are provided with a viscous, sticky adhesive in the form of a polymerized fused oil acrylate, which is formed by polymerization of the monomeric material in the microcapsule. However, in each of these prior systems, the polymeric core material is a tacky material which, unlike the polymeric core of the present microcapsules, is normally adherent to cellulosic substrates and the like. In addition, unlike the microcapsules of the prior art, where the core material is released upon rupture of the capsule walls, the present microcapsules are not "pressure rupturable," since they have a solid, non-tacky core which is grafted to the capsule wall. The term, "non-pressure rupturable" as used herein is intended to mean that the capsules are not rupturable under ordinary pressures, e.g., a writing instrument, or the like, for the purpose of releasing a liquid or tacky core material.

Any one of a variety of materials can be used to form the capsule walls of the microcapsules of the present invention. Thus, by practice of this invention, a single given polymerizable material, such as styrene, may be encapsulated by any of a number of different materials, such as urea-formaldehyde resin, gelatin, polyamide, and the like. After subjecting the microcapsules to polymerization conditions, the resulting products consist of polystyrene particles, for example, surrounded by a thin skin of the chosen encapsulant material. In this manner, the surface properties of said polystyrene particles may be adjusted to be more compatible with the particular substrate to which these microcapsular particles are to be applied. For example, in the case where the polymer-containing microcapsules are to be applied to a paper substrate as an opacifying agent, the use of a highly polar and hydrogen-bondable wall material, such as urea-formaldehyde resin, results in a product that is highly adherent to the substrate. Thus, such capsules are retained by the paper substrate much more efficiently than the inorganic pigments, e.g., $TiO_2$, or than unencapsulated polystyrene particles.

On the other hand this same monomer can be encapsulated, for example, with polyvinyl chloride providing, after subsequent polymerization, a polystyrene particle encased in a thin skin of polyvinyl chloride. Such particles could then be dispersed in a polyvinyl chloride matrix to provide a compatible composite.

Polymerization of the present precursor microcapsules may be initiated thermally, e.g., by the application of heat alone, or with the aid of a polymerization catalyst, such catalyst being either an oil-soluble material, e.g., benzoyl peroxide, incorporated in the dispersed monomer phase, or a water-soluble material, e.g., potassium persulfate, incorporated in the continuous aqueous phase. Thus, the present microcapsules may be provided with a core containing the monomer, styrene, and an effective amount of a polymerization catalyst for the styrene, such as benzoyl peroxide.

Alternatively, the monomer may be encapsulated and the polymerization catalyst then dissolved in the continuous phase, whereupon polymerization occurs when such an initiator radical diffuses into the capsule.

Likewise, a non-catalytic system may be employed wherein a monomer, such as styrene, may be provided as the liquid core of the microcapsule in the absence of a catalyst in the core and subsequently polymerized thermally, or by the application of radiation. Also, more than one monomer may be provided in the microcapsule in order to form a copolymeric core.

The term "core" as employed herein refers to that portion of the microcapsule which is contained within the solid wall or shell formed by the encapsulating agent and which is in the form of a filled-in (as opposed to a hollow) sphere. Whereas the core of the present monomer-containing precursor microcapsules is liquid throughout its entire crosssection, the core of the polymerized microcapsule is substantailly solid throughout its entire cross-section.

Either a catalytic or a non-catalytic polymerization system may be employed. If a catalytic polymerization system is desired, those systems generally referred to as free radical-type, may be suitably employed. Ionic catalysts could also be utilized insofar as the catalytic species is not inhibited or destroyed by the dispersing medium. Thus, in an aqueous medium, sodium hydroxide, an anionic catalyst, could be used to initiate the polymerization of acrylonitrile, however the use of butyl lithium to initiate the polymerization of styrene in such a system is impractical. On the other hand, this catalyst, as well as a cationic catalyst, such as titanium tetrachloride, could be used if the suspending medium were a saturated hydrocarbon fluid.

Catalysts can be incorporated either into the dispersed monomer phase or the continuous phase. The latter technique generally leads to the formation of polymers of higher molecular weight. Suitable catalysts include, for example, radiation, benzoyl peroxide, potassium persulfate, lauroyl peroxide, tertiary-butyl hydroperoxide, sodium peroxydiphosphate, hydrogen peroxide, azobisisobutyronitrile, and the like. Redox systems, such as potassium persulfatesodium metabisulfite, cumene hydroperoxide-cobalt salt, benzoyl peroxide-dimethylaniline, and the like can also be used. Subject to the criteria discussed previously, anionic catalysts, such as sodium hydroxide, potassium amide, sodium metal, butyl lithium, and the like; or cationic catalysts, such as aluminum chloride, titanium tetrachloride, boron trifluoride, and the like, with suitable co-catalysts when needed, may be used.

Catalyst concentrations may be varied over a wide range depending upon the purity of the monomer and molecular weight desired. Thus, for example, suitable amounts of catalyst include between about 0.01 and about 5 percent, preferably between about 0.1 and about 2.0 percent of the weight of the polymerizable monomer.

The polymerization of the monomer may be carried out under a variety of conditions. The same general criteria that affect normal polymerizations are still operable under this process. Thus, the molecular weight increases and the reaction rate decreases as the catalyst concentration and/or the reaction temperature is decreased. Conversion, or extent of reaction, is a function of reaction time at any particular combination of catalyst concentration and temperature. Conventional chain modifiers, such as dodecyl mercaptan, may also be used to regulate molecular weight. Thus, the molecular weight of the resultant polymer may be controlled by conventional means within the range normally obtainable with conventional procedures, depending upon the ultimate use of the polymer.

A vital feature of this invention is the ability to graft at least a portion of the polymer formed inside the capsule to the capsule wall. The extent of grafting is dependent on the nature of the wall material, monomer, catalyst and the processing conditions used. Thus, for example, the use of a catalyst in the dispersing medium, where it must first come in contact with the capsule wall before it can initiate polymerization of the monomer, generally results in a greater amount of grafting than the case where the catalyst is initially placed inside the capsule. The use of higher polymerization temperatures also promotes the grafting reaction. Also, those wall materials which are more susceptable to chain transfer reactions with the initiator specie or with the growing polymer chain-end produce products with greater amounts of grafted polymer.

The portion of the solid polymer core that is grafted to the capsule wall may be varied over a wide range. For example, it may be between about 20 percent and about 80 percent of its weight depending upon the particular application. Thus, when the microcapsules are to be employed as "spot welds" a higher degree of grafting is preferred, e.g., between about 50 and about 80 percent. For fused coatings a moderate degree of grafting, e.g., between about 40 and about 60 percent, is preferred. Depending upon the ratio of wall material to core initially used to prepare the microcapsules and on the extent of grafting occurring during polymerization, the product, i.e., the solid-walled microcapsules having an essentially solid polymeric core, may contain from less than 10 percent to over 60 percent of the total capsule weight as free (ungrafted) polymer in the core.

This feature aids in promoting the adhesion between the polymer and substrate when the capsule coating is subsequently fused. In this case, the graft polymer serves as a compatibilizing agent, promoting the adhesion between the substrate and the ungrafted polymer. The general theory of compatibilization is described in U.S. Pat. No. 3,485,777 to Gaylord.

Any suitable means of microencapsulation may be employed for the encapsulation of the liquid polymerizable monomeric system. Thus, the methods disclosed in U.S. Pat. Nos. 3,418,656 and 3,418,250 to Vassiliades may be suitably employed wherein the present polymerizable monomeric system is substituted for the oily substance employed in the methods disclosed therein. The disclosures of these patents are hereby incorporated by reference.

Microcapsules containing the liquid polymerizable monomeric system may be produced, for example, by the simple admixing of the following ingredients:

A. a liquid, polymerizable monomeric system;
B. an amphiphilic emulsifying agent;
C. at least one polymeric resin selected from the group consisting of:
  1. a hydrophobic, thermoplastic resin in a water- and oil-miscible organic liquid medium, said thermoplastic resin being capable of being separated from the medium in solid particle form as a precipitate upon dilution with water;
  2. a partially condensed thermosetting resin in an aqueous medium said resinous condensate being capable of being separated in solid particle form from the aqueous medium as a precipitate upon dilution with water; and
D. water in a quantity sufficient to cause the separation of at least one of the polymeric resins from its respective medium.

The sequence of the admixing of the foregoing materials must be such that the encapsulation of the polymerizable monomeric system by the resin by dilution with water and ultimate separation of the polymer in solid particle form about a nucleus of the liquid polymerizable monomeric system upon dilution with water occurs no sooner than simultaneous with the formation of the emulsion. In other words, dilution, which can be performed by the addition of water to the polymerizable monomeric system-emulsifier-resin admixture of by the addition of the resin to the water-polymerizable monomeric system-emulsifier-admixture, must be the final operation of the encapsulation process. Thus, in the first case the emulsifying operation and encapsulation operation can be considered to take place simultaneously, whereas in the second case, the emulsion has been already formed when it is admixed with the resin. In the foregoing manner, capsule walls of an essentially impermeable precipitate of a hydrophobic resin are formed about a nucleus of the liquid monomer.

Emulsifying agents which may be used in the formation of the microcapsules are "amphiphilic." That is, while the emulsifiers are generally preferentially soluble in one phase of the emulsion, they do possess an appreciable affinity for the other phase. It can be said that an amphiphilic emulsifier will give the monomer, such as styrene, a more hydrophilic nature than it had before, and conversely, give water a more lipophilic nature. Exemplary of the amphiphilic emulsifying agent which can be used in the instant invention are: naturally-occurring lyophilic colloids including gums, proteins and polysaccharides, such as gum arabic, gum tragacanth, agar, gelatin and starch; and synthetic materials such as methyl cellulose, hydroxyethyl cellulose, polyvinyl pyrrolidone, polyvinyl alcohol, and the salts of copolymers of styrene and maleic anhydride.

The partially condensed thermosetting resin that may be used as an encapsulating agent in the present invention must be water insoluble in its solid infusible state. These resins comprise that broad class of compositions defined as formaldehyde condensation products of formaldehyde with phenols such as hydroxybenzene (phenol), m-cresol and 3,5-xylenol; carbamides, such as urea; triazines such as melamine; amino and amido compounds, such as aniline, p-toluenesulfonamide, ethylene urea, guanadine; ketones, such as acetone and cycohexanone; aromatic hydrocarbons such as naphthalene; and heterocyclic compounds such as thipohene. Under the influence of heat, these resins change irreversibly from a fusible and/or soluble material to one that is infusible and insoluble.

The preferred formaldehyde condensation products employed in this aspect of the present invention are the condensed melamine-formaldehyde, phenol-formaldehyde and ureaformaldehyde resins. These partially condensed resins can be prepared easily according to conventional practices. For example, one of the melamine-formaldehyde partial condensates or syrups that may be used is prepared by refluxing 125 grams of melamine in 184 milliliters of formalin (37 percent by weight formaldehyde) neutralized to a pH of 8 with sodium carbonate. The mole ratio of formaldehyde to melamine in this reaction mixture is 2.3 to 1. The reaction continues for about 1 to 1 ½ hours at a temperature between 92°and 96°C. or until 1 volume of the condensate becomes turbid when diluted with 2 to 10 volumes of water. The condensate can be used immediately or can be stored for later use by adding a small amount, about 6 to 15 percent by weight, of methanol to the condensate. The methanol prevents any further rapid condensation of the resin solution upon standing and can be evaporated from the syrup, if desired, either prior to or during the admixing operation.

Similarly, a suitable urea-formaldehyde resin syrup may be prepared by substituting an equivalent molar quantity of urea for the melamine. The thermosetting resinous condensate of the present invention is employed in the form of an aqueous dispersion, clear or turbid, aqueous solution, or solid suspension in water of a partially-condensed, highly cross-linkable resin. The solution, dispersion or suspension are capable of being diluted up to at least twice their volume with water before any appreciable separation of the resin occurs from the water, i.e., precipitates. Thus, the condensate as employed in the present invention may be an aqueous solution similar to that produced in the synthesis of the melamineformaldehyde condensate previously described. Alternatively, the synthesis reaction may be continued beyond the time required to produce a clear solution so that the resulting product is either a clear or turbid dispersion of the condensate in water.

In addition, the aqueous condensate liquid may be prepared having a solids content which may be varied over a wide range, for example, between about 50 and about 80 percent solids. If a high solids-containing aqueous liquid is prepared initially, it may be diluted with water to a lower solids content before utilization in the microencapsulation process. In such instance, the diluted liquid may become turbid.

After the microcapsules are formed, further condensation or cross-linking of the resin may be accelerated by the application of heat and/or catalyst to the precipitated particles. Thus, microcapsules comprising walls of a thermosetting resin material become harder with the passage of time. Once the polymerizable monomeric system is encapsulated in a first resinous wall, a second dilution operation may be effected by simply adding another resin solution to the aqueous dispersion of the first-formed microcapsules. Consequently, double-walled microcapsules having an outer containing wall of the second resin are produced.

Brisk agitation is required in order to obtain very small droplets of the emulsion, and, ultimately, very small capsules. However, microcapsules having any desired average particle diameter may be produced as desired. Microcapsules having diameters ranging from below about 1 micron preferably between about 0.25 and one micron may be produced when it is desired to employ resulting polymerized products as opacifying agents. However, microcapsules having an average particle diameter of between one and 100 microns may be produced for other usages, such as for coating substrates and subsequent fusion of the microcapsular coating in order to produce a plastic surface or for spot-welding a fibrous substrate.

Agitation of the emulsion may be achieved by means of a high speed mixer or impeller, by ultrasonic waves or by other conventional means. This agitation need be maintained only in the zone of immediate admixing and not throughout in a manner such that the emulsion droplets have a predetermined average diameter prior to encapsulation so that upon completion of the encapsulation the final particle diameter of the microcapsules is within the desired range.

Suitable encapsulation temperatures include, for example, between about 0° and about 100°C., preferably between about 25° and about 45°C. Of course, temperatures should not be employed which cause premature polymerization of the monomer, i.e., prior to encapsulation.

An especially preferred method of providing the monomer system-containing microcapsules of the present invention, comprises admixing:

A. a water-immiscible, polymerizable monomeric material containing an oil-soluble, crosslinking agent; and B. an aqueous solution of an hydroxyl groupcontaining polymeric, emulsifying agent, said admixing being conducted under conditions to form an oil-in-water emulsion, wherein said monomeric material is dispersed in the form of microscopic droplets in an aqueous continuous phase, reacting said cross-linking agent with said polymeric emulsifying agent thereby surrounding each of said droplets with a solid, cross-linked capsule wall of the cross-linked emulsifying agent.

The reaction of the cross-linking agent with the polymeric emulsifying agent, i.e., the curing step, may be conducted at any suitable temperature, for example, between about ambient temperature and about 100°C. for periods of time between about one and about 24 hours. The upper temperature at which the curing step may be conducted is only limited by the temperature at which the emulsion will break, i.e., the stability limit of the emulsion. Preferably, the cross-linking reaction is conducted at a temperature in the range of between about 40° and about 80°C., for a period of about 1–3 hours.

The ratio of polymeric emulsifying agent to crosslinking agent that is provided in the emulsion is at least one part by weight of emulsifying agent per part of cross-linking agent. Thus, suitable ratios of emulsifier to crosslinking agent include between one and about 100 parts by weight of emulsifying agent per part of cross-linking agent, preferably between about 4 and about 20 parts by weight of emulsifying agent per part of cross-linking agent.

In this system, the capsule walls are formed solely by the reaction of the cross-linking agent with the polymeric emulsifying agent. Thus, the emulsifying agent is the sole co-reactant for the cross-linking agent.

Any suitable polymerizable monomer, such as those described previously may be employed, while the oil-soluble cross-linking agent may be an oil-soluble resin, such as the modified condensation products of formaldehyde with phenols such as, hydroxybenzene (phenol), m-cresol and 3,5-xylenol; carbamides, such as urea; and triazines, such as melamine; amino and amido compounds, such as, aniline, p-toluenesulfonamide, ethyleneurea and guanidine; ketones, such as acetone and cyclohexanone; aromatic hydrocarbons, such as naphthalene; and heterocyclic compounds, such as, thiophene. Under the influence of heat, these resins change irreversibly from a fusible and/or soluble material into an infusible and insoluble material.

The preferred cross-linking agents are the partially-condensed melamine-formaldehyde, phenol-formaldehyde and urea-formaldehyde resins. The modified B-stage melamine and urea-formaldehyde resins are especially preferred.

Oil-soluble partially condensed resins can be prepared easily according to conventional practices. For example, the compatibility of the partially condensed resin with various oily solvents can be influenced by alkylating the resin with an alkanol, such as butanol or a combination of butanol with a higher alkanol, such as octyl alcohol or the like. The preparation of a suitable oil-soluble melamine-formaldehyde and its modification with butanol is described on pages 460–461 of *Preparative Methods of Polymer Chemistry*, by Wayne R. Sorenson (Inter-Science Publishers, 1961), the disclosure of which is hereby incorporated by reference.

The substitution of a portion of the butanol alkylating agent by the higher alkanol increases the compatibility of the resin, e.g., melamine formaldehyde, with the hydrocarbon solvent. The properties of such melamine resins are described on pages 192 and 193 of *Amino Resins* by John F. Blais (Reinhold Publishing Corp., N.Y., 1959).

The water-soluble, hydroxyl group-containing, polymeric emulsifier is cross-linked by the cross-linking agent dissolved in the oil phase at the oil-water interface to form a solid microcapsular shell. Suitable water-soluble polymers which may be employed in the present invention include thermoplastic resins, such as starch, polyvinyl alcohol, methyl cellulose, and the like.

Preferred water-soluble polymers are substituted starches and polyvinyl alcohol. Such substituted starches may be provided by any suitable process, for example, by an etherification of the starch in granule form under nongelatinizing conditions with a monofunctional etherifying agent which provides the starch with ether-linked hydrophobic groups. Thus, the starch granule will become more oleophilic due to the presence of a high percentage of hydrophobic groups. The hydrophobic groups may be, for example, alkyl groups having at least three carbon atoms, aralkyl groups containing at least seven carbon atoms, and the like. Thus, the term "substituted starch" as employed herein refers to a starch that has been rendered more oleophilic due to an increase in hydrophobic groups.

Suitable etherifying agents, which react with ungelatinized granule starch in alkaline media to produce substituted starch, include alkyl halides containing at least three carbon atoms, for example, alkyl chloride or bromide, and substituted alkyl halides such as methallyl chloride; aralkyl halides, for example, benzyl chloride or bromide, p-halo benzyl chloride or bromide, or 3-choro propenyl benzene; epoxy reagents, for example, phenyl glycidyl ether and allyl glycidyl ether.

The etherification reaction is conducted until the starch becomes more hydrophobic and essentially non-gelatinizable. Finally, the starch is fragmented and reduced to submicron-sized particles by treatment with steam under pressure. The starch is not swollen or cooked but is reduced to very fine particles which are mainly in the microscopic or colloidal size range. Such starches are described, for example, in U.S. Pat. No. 3,462,283 to Hjermstad et al the disclosure of which is hereby incorporated by reference.

The polyvinyl alcohol especially preferred in this process are those grades known as 88 percent (nominal) hydrolyzed, high molecular weight products (e.g., commercially available as Covol 97–40 from CPI or Elvanol 50–42 from DuPont). However, any of the available water-soluble grades, either fully or partially hydrolyzed, high or low molecular weight, can be utilized.

The cross-linking agent is utilized in amounts sufficient to result in the formation of microcapsules. The relative amounts vary with the particular system, and may be easily determined in each case. However, the hydroxyl group-containing, polymeric emulsifying agent of the preferred system is dual functional, and serves not only as emulsifying agent, but preferably provides the major portion of the capsule shell.

Thus, as previously mentioned, the polymeric emulsifying agent is provided in relatively substantial amounts of, for example, at least one part by weight of emulsifier per part of cross-linking agent, with an especially preferred range of between about 4 and about 8 parts emulsifier per part by weight of the oil-soluble cross-linking agent. A suitable range of cross-linking agent based upon the oil is between about one and about 40 weight percent of cross-linking agent, preferably between about 5 and about 20 weight percent.

Emulsification may be conducted at any suitable temperature. For example, temperatures in the range of between about 20° and about 80°C., although temperatures outside of this range may also be utilized. Likewise, emulsification is conducted under conditions of agitation. As previously mentioned, the microcapsular dispersion is preferably heated to a temperature in the range of between about 40° and about 80°C. for a period of between about 1 and about 3 hours under conditions of mild agitation in order to accelerate the cross-linking reaction.

A second cross-linking agent for the polymeric emulsifying agent may be added to the microcapsular dispersion after formation of the solid, cross-linked capsule walls by the reaction between the oil-soluble cross-linking agent within the oil droplets and the emulsifying agent. The second cross-linking agent may be a non-metallic, water-soluble material, such as urea-formaldehyde, melamine-formaldehyde, an aldehyde, such as glyoxal, etc., and may be added via the aqueous, continuous phase of the dispersion. Suitable amounts of the water-soluble cross-linking agent include the same amount as the oil-soluble cross-linking agent. Exemplary amounts of the water-soluble cross-linking agent include, between about one and about 50 parts of emulsifier per part of water-soluble cross-linking agent.

Regardless of the manner of providing the monomer system-containing precursor microcapsules, the microcapsules are thereafter subjected to polymerization conditions in order to cause the liquid monomeric system to polymerize to form a solid spherical polymeric core within the microcapsules. Accordingly, in order to cause polymerization of the microcapsules they may be heated, for example, to temperatures, in the range of between about 0° and about 200°C. depending upon the catalyst system employed. Thus, for benzoyl peroxide, the preferable temperature is between about 60° and about 90°C. for a period of time, for example, of between about 2 and about 24 hours preferably between about 3 and about 6 hours. For a potassium persulfate-sodium metabisulfite redox system, on the other hand, the preferred temperature is between about 20° and about 40°C. Such conditions are completely conventional in the practice of polymerization technology and would be within the skill of the art.

The temperature of polymerization may be varied over a wide range depending upon the particular monomer or monomers undergoing reaction and whether or not a catalyst is employed. However, the upper temperature limit will be that at which the structural integrity of the microcapsular wall is destroyed or rapid volatilization of the dispersing medium occurs. The temperature will be dependent on the nature of the wall material as well as of the dispersing medium. Obviously, a thermosetting capsular wall material can be utilized at higher temperatures than a thermoplastic one. The polymerization reaction may be conducted in a closed, pressurized vessel, if desired, to reduce the volatility of the ingredients.

The heating of the microcapsules in order to induce polymerization may take place at any time subsequent to their formation. Thus, for example, immediately following the microencapsulation step, the entire microcapsular dispersion may be heated to temperatures sufficient to decompose the catalyst (if one is used) and initiate polymerization. On the other hand, the monomer-containing microcapsules may first be coated onto or incorporated into the desired substrate and subsequently heated or irradiated to induce polymerization of the monomeric core. In general, the microcapsules may be heated to any temperature capable of polymerizing the encapsulated monomer. Preferably, a constant temperature is maintained on the system until the polymerization is complete or until the desired extent of polymerization is attained.

As previously mentioned, the walls of the polymer-containing capsules may be cured either by the addition of the curing catalyst, or by adjusting the temperature of the system, for example, in the range of between about 25° and 100°C., preferably between about 60° and 80°C., or by a combination of both catalyst and temperature. Alternatively, depending upon the specific system employed, the walls of the microcapsules may be cured prior to the polymerization of the monomeric core. Likewise, the microcapsules may be spray-dried either prior to or subsequent to polymerization in order to separate them from the liquid medium in which they are suspended. Spray-drying may be conducted at temperatures in the range of between 60° and 200°C., preferably between about 85° and 100° C., for example. A small amount of a polymerization inhibitor may be incorporated into the monomer prior to encapsulation to retard polymerization when employing elevated temperatures.

As previously mentioned, any suitable means of microencapsulation of the polymerizable monomeric system may be employed. Thus, the microcapsules may be formed by a process which is similar to those described in co-pending Vassiliades application, Ser. No. 583,046, filed Sept. 29, 1969, which is hereby incorporated by reference, in which the present polymerizable monomeric system is substituted for the oily material encapsulated therein. Likewise, encapsulation techniques involving the phenomenon known as "coacervation" may be employed for the formation of microcapsules for use in the present invention. Accordingly, any microencapsulation method whether chemical or physical, which is capable of yielding polymerizable monomer system-containing microcapsules may be employed in the process of the present invention.

The conditions employed for fusing the polymer-containing capsules, i.e., temperature and pressure, will depend upon the nature of the polymeric core and its molecular weight; the type of coating or spot-weld desired; the nature of the substrate; the wall thickness of the capsules to be employed, etc. The particular conditions which are desirable for a specific application may be easily determined experimentally.

The following examples illustrate the production of polymer products having a predetermined particle size and constitute the best modes contemplated for carrying out the present invention.

EXAMPLE 1

Fifty grams of undistilled styrene monomer containing 1.0 grams of benzoyl peroxide are emulsified in 183 grams of an 8.2 percent aqueous solution of methyl cellulose in a Waring blender. Agitation is continued until the desired particle size is attained, whereupon 30 grams of a partially condensed (B-stage) urea-formaldehyde resin (65 percent solids) are added with brisk agitation. The suspension of microcapsules thus formed have an average particle diameter of about 0.7 micron.

The microcapsular suspension is then heated at 60°C. for 3 hours thereby forming microcapsules containing a polystyrene core. The average particle diameter of these polymer-containing microcapsules is about 0.7 micron, or essentially the same as the microcapsules prior to polymerization.

The capsular suspension is then dried, the recovered solids pressed under 10,000 lbs. at 150°C. to rupture the capsules. The resultant film is ground and extracted with refluxing benzene. About 10 percent of the dry capsule weight is recovered as soluble polystyrene having a viscosity average molecular weight of 685,000.

EXAMPLE 2

Styrene monomer containing 2 percent dissolved benzoyl peroxide is emulsified and encapsulated in the manner described in Example 1. However, the degree of agitation and mixing time is reduced to produce particles having an average diameter of about 5 microns. Polymerization is carried out at 60°C. for about 24 hours. Subsequent to polymerization the microcapsular suspension is spray-dried. Some aggregation occurs during this stage of the process, but the aggregates are easily comminuted.

A sample of the spray-dried capsules is hot pressed, ground, and extracted as described in Example 1, yielding 50 percent of the capsule weight as soluble polystyrene with a molecular weight of 490,000.

EXAMPLE 3

Fifty grams of distilled styrene monomer without an added polymerization catalyst are encapsulated as described in Example 1, thereby yielding microcapsules with an average diameter of 2.5 microns. One-half gram of a water-soluble initiator, potassium persulfate, is added to the aqueous phase and the suspension is heated at 60°C. for 24 hours to effect polymerization. The capsules are isolated by drying the suspension and then hot pressed, ground and extracted with refluxing benzene. About 36 percent of the dry capsule weight is recovered as soluble polystyrene having a molecular weight of 951,000. A weight balance indicates that more than 80 percent of the styrene monomer is converted to polymer.

EXAMPLE 4

For comparative purposes, a polystyrene latex is prepared by standard emulsion polymerization techniques. Thus, 200 grams of distilled styrene monomer are emulsified in 360 grams of water containing 5 grams of potassium oleate. One gram of potassium persulfate is added to the aqueous phase, the emulsion is purged with nitrogen and heated at 60°C. for 5 hours. The particle size is estimated at about 0.1 micron and the polymer has a molecular weight of 957,000.

A film of this latex is deposited on a paper substrate using a 0.0005 inch Bird applicator. In a similar manner, films of the microcapsular suspensions prepared in Example 1 and 3, respectively, are also deposited on paper substrates. These coatings are first air-dried and then further dried in an 80°C. force draft oven for 10 minutes. The latex coating is very chalky and easily rubs off on the fingers, whereas the two microcapsular coatings exhibit good adhesion to the substrate.

The coated papers are hot pressed at 160°C. under 2,000 psi between chrome plated steel sheets. The microcapsule coated papers yield a glossy smooth surface whereas the latex coated paper exhibits a splotchy surface.

EXAMPLE 5

Fifty grams of distilled styrene monomer are emulsified in 183 grams of an 8.2 percent aqueous solution of methyl cellulose under brisk agitation and 20 grams of a B-stage urea-formaldehyde resin (65 percent solids) are added. The suspension of microcapsules thus formed has an average particle diameter of about 3.5 microns.

The suspension is purged with nitrogen, one gram of potassium persulfate is added and then one gram of sodium bisulfite is dissolved in about 50 milliliters of water and is added incrementally over a 6 hour reaction period at ambient temperature. The resultant polymer-containing capsules still have an average diameter of about 3.5 microns.

EXAMPLE 6

Fifty grams of distilled styrene monomer are encapsulated and polymerized as described in Example 5, except that lesser quantities of materials are used in order to give a higher ratio of solid polymer core to the capsule wall. Thus, in this Example, 125 grams of 6 percent aqueous methyl cellulose solution, 5 grams of B-stage urea-formaldehyde resin (65 percent solids), 0.5 gram potassium persulfate and 0.5 gram sodium bisulfite are used. Capsules with an average diameter of 3.5 microns are obtained.

EXAMPLE 7

Fifty grams of distilled styrene monomer containing 0.5 gram of benzoyl peroxide are emulsified in 143 grams of a 7 percent ammoniacal solution of styrene-maleic anhydride polymer in a Waring blender. Five grams of a B-stage ureaformaldehyde resin (65 percent solids) are added with brisk agitation, yielding microcapsules having an average diameter of about 4 microns. The suspension is then heated at 60° to 65°C. for 32 hours to effect polymerization. The capsule size after polymerization is still about 4 microns.

EXAMPLE 8

Fifty grams of distilled styrene monomer are encapsulated and polymerized as described in Example 6 except that 75 grams of a 10 percent aqueous solution of benzylated starch is substituted for the methyl cellulose solution of that example. The particle size of the resultant microcapsules, both before and after polymerization, is about 4.5 microns.

EXAMPLE 9

Fifty grams of distilled styrene monomer are encapsulated and polymerized as described in Example 6 except that 112.5 grams of a 20 percent aqueous solution of oxidized starch are substituted for the methyl cellulose solution and 36 grams of the urea-formaldehyde resin solution is used. The particle size of the resultant microcapsules, both before and after polymerization, is about 4.5 microns.

EXAMPLE 10

Fifty grams of distilled styrene monomer are dissolved in 100 milliliters of tetrahydrofuran containing 10 grams of polyvinyl chloride. The solution is agitated briskly and 70 milliliters of water containing 0.1 gram of sodium carbonate is added. As the stirring continues, 150 milliliters of water containing 12 grams of gelatin and 12 grams of methyl cellulose are added.

The microcapsular suspension is purged with nitrogen, 0.5 gram of potassium persulfate added, and then 0.5 gram of sodium bisulfite dissolved in 50 milliliters of water is added incrementally over a 6 hour reaction period at ambient temperature. The resultant polymer-containing microcapsules have an average particle size of 1.5 microns.

EXAMPLE 11

The microencapsulation and polymerization processes are conducted in the same manner as described in Example 5 except that a mixture of 37.5 grams distilled styrene and 12.5 grams distilled acrylonitrile are used as the polymerizable monomer system. The resultant polymer-containing microcapsules have an average diameter of 4 microns.

EXAMPLE 12

The encapsulation and polymerization are carried out in the same manner as described in Example 5 except that a mixture of 37.5 grams of distilled styrene and 12.5 grams distilled isoprene is used as the polymerizable monomer system. The resultant polymer containing microcapsules have an average diameter of about 5.5 microns.

A sample of each of the microcapsular suspensions produced in Examples 5 through 12 is dried, fused, ground, and extracted in the manner described in Example 1. The resulting material is analyzed and the results are set forth in TABLE I, below:

bearing agents when coated onto copy paper along with dye-containing microcapsules in a transfer copy system.

EXAMPLE 15

A 20 percent aqueous suspension of polystyrene-containing microcapsules (average particle size 6 microns) is coated onto bond paper and dried under normal paper coating conditions. The dry coat weight is varied from 4 to 6 pounds/ream (3300 square feet). The paper is subsequently hot calendered at 80°C., 3 nips at 500 psi. The microcapsular coating is fused to give a high gloss (approximately 65) coating that is water resistant and has excellent resistance to oil and grease.

EXAMPLE 16

A 40 percent aqueous suspension of polystyrene-containing microcapsules (average particle size one micron) is cast coated against a highly polished chrome coated drum. The cast coating drum is heated to 120°C. to dry the coating and fuse the microcapsules. The dry coat weight is varied from one to four pounds/-

TABLE I

| Polymer-Containing Microcapsules from Example No. | Conversion to Polymer (% by Wt.) | Total Polymer[1] (% by Wt.) | Soluble Polymer[2] (% by Wt.) | Grafted Polymer[3] (% by Wt.) | Grafted Polymer Add-on (% by Wt.) | Mol. Weight of Soluble Polymer |
|---|---|---|---|---|---|---|
| 5  | 75 | 57 | 15 | 75 | 100 | $2.1 \times 10^6$ |
| 6  | 88 | 80 | 25 | 69 | 281 | $1.6 \times 10^6$ |
| 7  | 95 | 78 | 59 | 24 | 87  | $3.0 \times 10^6$ |
| 8  | 96 | 82 | 24 | 71 | 324 | $1.6 \times 10^6$ |
| 9  | 69 | 44 | 8  | 83 | 64  | — |
| 10 | 58 | 40 | 33 | 28 | 24  | $9.3 \times 10^6$ |
| 11 | 51 | 70 | 31 | 56 | 131 | $2.2 \times 10^6$ |
| 12 | 91 | 81 | 17 | 80 | 336 | — |
| 13 | 41 | 65 | 41 | 38 | 71  | — |

[1] Total polymer content of dried capsular suspension.
[2] Soluble polymer content of dried capsular suspension.
[3] Portion of polymer grafted to capsule wall material.

EXAMPLE 13

A mixture of 45 grams of distilled butyl acrylate and five grams of ethylene glycol dimethacrylate monomers are emulsified in 231 grams of a 6.5 percent aqueous methyl cellulose solution and 10 grams of a B-stage urea-formaldehyde resin (65 percent solids) are added.

Potassium persulfate in an amount of 0.4 gram, is added to the suspension, and 0.4 gram sodium bisulfite dissolved in 50 milliliters of water is then added incrementally over a 6 hour reaction period at ambient temperature.

The resultant polymer-containing microcapsules have an average diameter of about 4 microns.

EXAMPLE 14

Fifty grams of distilled styrene containing 0.75 gram of benzoyl peroxide are emulsified in 375 grams of 2 percent aqueous solution of methyl cellulose under mild agitation, and 5.33 grams of a B-stage urea-formaldehyde resin (61 percent solids) are added. The suspension of microcapsules thus formed have an average particle diameter of about 30 microns.

The suspension is heated to 80°C. for 2 hours to effect polymerization. The resultant polymer-filled microcapsules have a particle size of 30 microns, i.e., essentially the same as the capsules prior to polymerization. The resulting capsules provide excellent load ream (3300 square feet). Even at low weights the coating has excellent gloss (approximately 70 to 80). However, the water resistance and barrier to oil and grease is improved at the higher coat weights, and at 2 to 3 pounds/ream the coating is impervious.

The microcapsular coating is applied to both uncoated bond paper and bond paper which has 5 pounds/ream of clay coating, and calendered producing a high gloss coating. In the latter case, the gloss is approximately 10 to 20 percent higher than the unprecoated paper at corresponding coat weights.

EXAMPLE 17

A 20 percent aqueous suspension of polystyrene containing microcapsules (average particle size 0.8 micron) is coated onto bond paper with conventional paper coating techniques. The opacity of the uncoated and coated paper is 72 percent and 84 percent, respectively. This represents an increase of 12 units for a coat weight of 5 pounds/ream.

EXAMPLE 18

A solution consisting of 80 parts by weight of styrene monomer, 20 parts of a 50 percent solids solution of an oil-soluble melamine-formaldehyde condensation product, and 1 part benzoyl peroxide are emulsified in 400 parts by weight of a 7.5 percent aqueous solution of a benzylated starch (commercially available as Emulsicote 87 from Pennick and Ford). Agitation is continued in a Waring blender to yield particles having a 15 to 20 micron average diameter. The resulting dispersion is then heated while under conditions of mild agitation for a period of 2 hours at a temperature of 60°–65°C. in order to cure the capsule wall. Next, the dispersion is heated for an additional 2 hours at a temperature of 85°–90°C. to polymerize the styrene monomer core.

The resulting capsules are then admixed with microcapsules containing a dye intermediate and the resulting admixture is coated onto a paper substrate to provide a transfer copy sheet.

EXAMPLE 19

Eighty parts of styrene monomer, 20 parts of a 50 percent solids solution of an oil-soluble melamine-formaldehyde condensation product, and 1.6 parts of benzoyl peroxide are admixed to provide a clear solution. The resulting solution is then emulsified in 533 parts of a 7.5 percent by weight aqueous solution of polyvinyl alcohol (commercially available as Elvanol 50–42 from DuPont) until particles having an average diameter of 15 to 20 microns is provided.

Next, 1.6 parts by weight of a water-soluble melamine-formaldehyde condensate (60 percent solids) is added to the aqueous phase and the resulting dispersion was heated at a temperature of 75°–80°C. under mild agitation for a period of 6 hours to polymerize the styrene monomer and provide microcapsular load-bearing agents. The resulting capsules are then composited with dye intermediate-containing capsules having an average particle diameter of about 5 microns and the resulting dispersion is coated onto a paper substrate to provide the transfer copy sheet.

EXAMPLES 20–29

A solution consisting of 80 grams of partially hydrogenated terphenyl (commercially available as HB–40 from Monsanto), 120 grams of coconut oil, 2.1 grams of crystal violet lactone and 1.8 grams of benzoyl leucomethylene blue is emulsified in 1000 grams of a 6 percent aqueous solution of methyl cellulose until emulsion droplets having an average diameter of 4 microns are obtained. Under continuous agitation 40 grams of a 65 percent solids aqueous dispersion of a B-stage urea-formaldehyde condensation product is slowly added. This suspension is then heated under mild agitation for 4 hours at 60°C. to cure the capsule walls.

The resulting suspension of dye-precursor capsules is then divided into 10 equal portions. Three portions are admixed with finely ground cellulose in varying amounts. Three other portions are admixed with varying amounts of the aqueous polystyrene suspension of the starch microcapsular loadbearing agents of Example 18, while three other portions are admixed with various amounts of the aqueous suspension of the polystyrene polyvinyl alcohol load-bearing agents of Example 19. The remaining portion servies as a control. The results are shown in Table II, below:

TABLE II

| Example No. | Load-Bearing Agent | Amount Admixed (grams*) | Impact Intensity | Smudge |
|---|---|---|---|---|
| 20 | — | — | very high | very high |
| 21 | cellulose | 2.0 | high | high |
| 22 | d.o. | 6.0 | moderate | high |
| 23 | d.o. | 10.0 | low | moderate |
| 24 | polystyrene/starch | 8.3 | high | d.o. |
| 25 | d.o. | 25.0 | d.o. | low |
| 26 | d.o. | 41.5 | moderate–high | none |
| 27 | polystyrene/polyvinyl alcohol | 9.7 | high | moderate |
| 28 | d.o. | 29.2 | d.o. | low |
| 29 | d.o. | 48.5 | moderate–high | none |

*Weight based upon dry cellulose and aqueous suspension of microcapsular load-bearing agents.

As can be seen upon viewing the results in Table II, the conventional cellulosic load-bearing agent reduces the smudge, while having little effect upon image intensity.

Polymeric products of the present invention may be employed in any application where polymeric particles having a substantially spherical shape and predetermined particle size are desired. For example, the subject polymeric products may be substituted for conventional pigments that have been employed for inducing or increasing opacity of substrates. Thus, the present resin particles having an average particle diameter less than one micron, for example, may be used in paints, in inks, in plastics, glass, metal, wood, plaster, in films, on fabrics, paper, and the like. The present polymeric products may also be applied to a substrate such as wood surface, and thereafter fused to a temperature at which the polymeric material is rendered molten in order to produce a uniform polymeric coating.

Although the invention has been described in considerable detail with particular reference to certain preferred embodiments thereof, variations and modifications can be effected within the spirit and scope of the invention as described herein and before and as defined in the appended claims.

What is claimed is:

1. A record sheet which comprises a substrate having a coating on a surface thereof, which coating comprises pressure-rupturable, image-forming microcapsules, a binder for said image-forming microcapsules and an effective amount of microcapsular load-bearing agents, said load-bearing agents consisting essentially of discrete, substantially spherical non-pressure rupturable microcapsules having a solid, polymeric shell and a solid, polymeric core, said shell being adherable by said binder to said substrate, said polymeric core being at least partially grafted to said polymeric shell, said core and said shell being formed of different polymeric materials, said load-bearing microcapsules having a larger average diameter than said image-forming microcapsules, said load bearing agents having an average diameter in the range of between about 5 and about 50 microns.

2. The record sheet of claim 1 wherein said load-bearing agents have an average diameter in the range of between about 15 and about 30 microns.

3. The record sheet of claim 1 wherein the shell of said load-bearing agent comprises an hydroxylated polymer and said core is formed of a thermoplastic polymer.

4. The record sheet of claim 3 where said shell comprises a substituted starch, methyl cellulose or polyvinyl alcohol.

5. The record sheet of claim 4 wherein said shell comprises polyvinyl alcohol.

6. The record sheet of claim 1 wherein between about 20 and about 80 percent of said polymeric core material is grafted to said polymeric shell.

7. The record sheet of claim 4 wherein said polymeric core comprises polystyrene.

8. The record sheet of claim 5 wherein said polymeric core material comprises polystyrene.

9. The record sheet of claim 1 wherein said polymeric core is a non-tacky polymeric material.

10. A record sheet which comprises a substrate having a coating on a surface thereof, which coating comprises pressure-rupturable, image-forming microcapsules and an effective amount of microcapsular load-bearing agents, said load-bearing agents consisting essentially of discrete, substantially spherical, non-pressure rupturable microcapsules having a solid, polymeric shell and a solid, polymeric core, said polymeric core being at least partially grafted to said polymeric shell, said core and said shell being formed of different polymeric materials, said image-forming microcapsules having a shell that is formed of the same material as is said solid, polymeric shell of said load-bearing agents, said load-bearing microcapsules having a larger diameter than said image-bearing microcapsules, said load bearing microcapsules having an average diameter in the range of between about 5 and about 50 microns.

* * * * *